United States Patent
Liu et al.

(10) Patent No.: US 11,341,990 B1
(45) Date of Patent: *May 24, 2022

(54) DUAL WIRE ASSISTED MAGNETIC RECORDING

(71) Applicant: Seagate Technology LLC, Fremont, CA (US)

(72) Inventors: Zengyuan Liu, Eden Prairie, MN (US); Edward Charles Gage, Lakeville, MN (US); Tim Rausch, Farmington, MN (US); Stephanie Hernandez, Fremont, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,547

(22) Filed: May 26, 2021

Related U.S. Application Data

(63) Continuation of application No. 16/870,538, filed on May 8, 2020, now Pat. No. 11,049,515.

(51) Int. Cl.
  *G11B 5/245* (2006.01)
  *G11B 5/39* (2006.01)
  *G11B 5/00* (2006.01)

(52) U.S. Cl.
  CPC .......... *G11B 5/2457* (2013.01); *G11B 5/3912* (2013.01); *G11B 2005/0032* (2013.01)

(58) Field of Classification Search
  None
  See application file for complete search history.

(56) References Cited

U.S. PATENT DOCUMENTS

| | | | |
|---|---|---|---|
| 7,149,055 B2 | 12/2006 | Clinton et al. | |
| 7,212,367 B2 | 5/2007 | Clinton et al. | |
| 7,818,760 B2 | 10/2010 | Seigler et al. | |
| 7,869,309 B2 | 1/2011 | Mihalcea et al. | |
| 8,035,923 B2 | 10/2011 | Suzuki et al. | |
| 8,077,417 B2 | 12/2011 | Mallary et al. | |
| 8,264,916 B1 * | 9/2012 | Aoyama | G11B 5/314 |
| | | | 369/13.13 |
| 8,270,112 B2 | 9/2012 | Funayama et al. | |

(Continued)

OTHER PUBLICATIONS

Prosecution issued by U.S. Patent Office for U.S. Appl. No. 16/440,306, filed Jun. 13, 2019, including Notice of Allowance and Fees Due (PTOL-85) dated Apr. 1, 2020, 7 pages; Applicant Initiated Interview Summary (PTOL-413) dated Mar. 13, 2020, 3 pages; Non-Final Rejection dated Dec. 20, 2019, 7 pages; 17 pages total.

(Continued)

*Primary Examiner* — William J Klimowicz
(74) *Attorney, Agent, or Firm* — Westman, Champlin & Koehler, P.A.

(57) ABSTRACT

A recording head for writing data on tracks of a data storage medium is provided. The recording head includes a writer having a write pole and a trailing shield. The write pole includes a pole tip configured to write on the tracks of the data storage medium. The recording head also includes first and second writing-assistance wires positioned between the pole tip and the trailing shield in a down-track direction to enable a writing-assistance current to be provided to produce an assist magnetic field that augments a write field produced by the write pole.

20 Claims, 9 Drawing Sheets

(56) References Cited

U.S. PATENT DOCUMENTS

| | | | |
|---|---|---|---|
| 8,286,333 | B2 | 10/2012 | Amin et al. |
| 8,339,736 | B2 | 12/2012 | Gao et al. |
| 8,411,390 | B2 | 4/2013 | Franca-Neto et al. |
| 8,587,900 | B2 | 11/2013 | Franca-Neto et al. |
| 8,634,163 | B2 | 1/2014 | Tanabe et al. |
| 8,638,527 | B2 | 1/2014 | Franca-Neto et al. |
| 8,908,330 | B1 | 12/2014 | Mallary |
| 9,159,339 | B2 | 10/2015 | Scholz et al. |
| 9,355,654 | B1 | 5/2016 | Mallary |
| 9,490,620 | B1 | 11/2016 | Albrecht et al. |
| 9,508,371 | B2 | 11/2016 | Stoebe et al. |
| 10,424,345 | B1 | 9/2019 | Namihisa et al. |
| 10,706,876 | B1 | 7/2020 | Rausch et al. |
| 10,748,562 | B1 | 8/2020 | Chen |
| 10,832,710 | B1* | 11/2020 | Song ................ G11B 5/012 |
| 10,867,626 | B1 | 12/2020 | Li et al. |
| 11,049,515 | B1* | 6/2021 | Liu .................. G11B 5/1278 |
| 2003/0043490 | A1 | 3/2003 | Clinton et al. |
| 2004/0169950 | A1* | 9/2004 | Clinton ............ G11B 5/743 360/125.32 |
| 2008/0112087 | A1 | 5/2008 | Clinton et al. |
| 2009/0002883 | A1 | 1/2009 | Ionescu et al. |
| 2009/0002895 | A1 | 1/2009 | Pust et al. |
| 2009/0109570 | A1* | 4/2009 | Scholz .............. G11B 5/1278 360/129 |
| 2009/0237837 | A1 | 9/2009 | Amin et al. |
| 2009/0262636 | A1 | 10/2009 | Xue et al. |
| 2011/0007428 | A1 | 1/2011 | Batra et al. |
| 2011/0090596 | A1* | 4/2011 | Franca-Neto ........ G11B 5/3153 360/125.03 |
| 2013/0003225 | A1 | 1/2013 | Amin et al. |
| 2013/0057983 | A1 | 3/2013 | Tanabe et al. |
| 2013/0120869 | A1 | 5/2013 | Das et al. |

OTHER PUBLICATIONS https://www.anandtech.com/show/14869/western-digital-announces-18-tb-eamr-hard-drive, by Anton Shilov on Sep. 18, 2019 6:30 PM EST, 2020, 5 pages.

Prosecution issued by U.S. Patent Office for U.S. Appl. No. 16/870,538, filed May 8, 2020, including Notice of Allowance and Fees Due (PTOL-85), including Examiner Interview Summary Record (PTOL-413) dated Apr. 13, 2021, 15 pages; Non-Final Rejection dated Jan. 12, 2021, 10 pages; Requirement for Restriction/Election dated Nov. 30, 2020, 7 pages; 32 pages total.

* cited by examiner

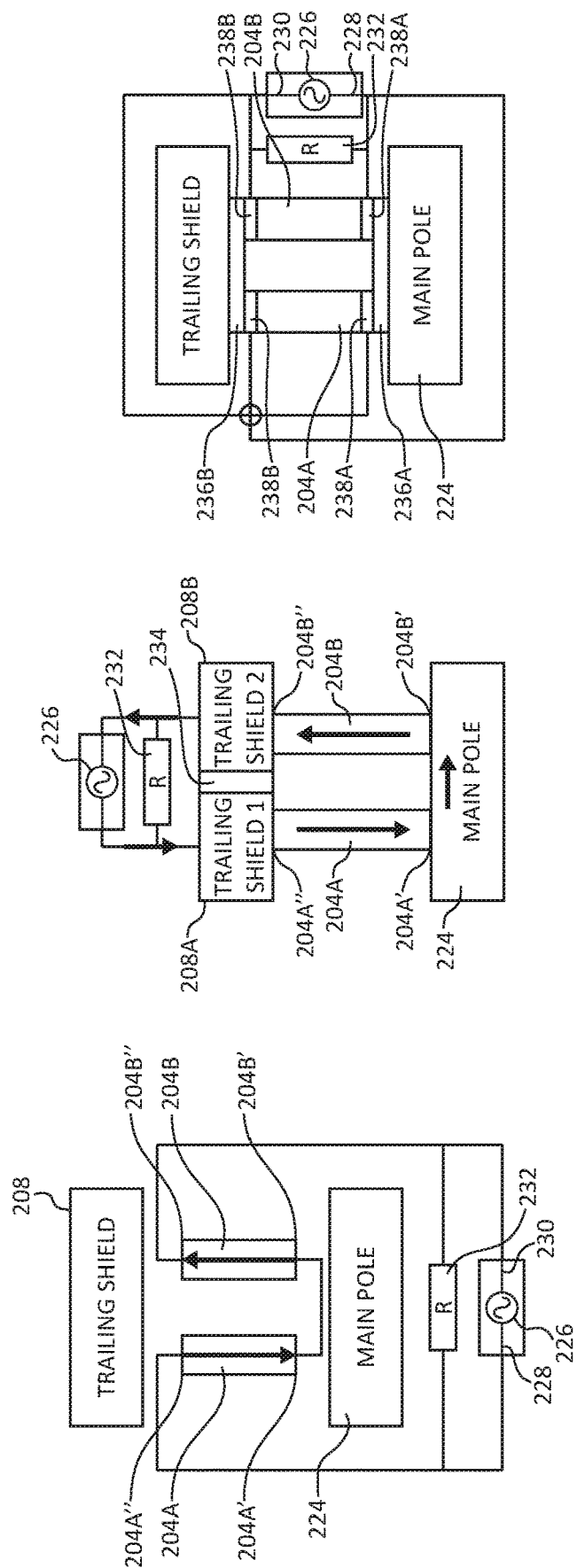

“DUAL WIRE ASSISTED MAGNETIC RECORDING

CROSS-REFERENCE TO RELATED APPLICATION

This application is a continuation application of U.S. application Ser. No. 16/870,538, filed May 8, 2020, the content of which is hereby incorporated by reference it its entirety.

SUMMARY

In one embodiment, a recording head for writing data on tracks of a data storage medium is provided. The recording head includes a writer having a write pole and a trailing shield. The write pole includes a pole tip configured to write on the tracks of the data storage medium. The recording head also includes first and second writing-assistance wires positioned between the pole tip and the trailing shield in a down-track direction to enable a writing-assistance current to be provided to produce an assist magnetic field that augments a write field produced by the write pole.

In another embodiment, a method provided. The method includes providing a writer having a write pole and a trailing shield, the write pole comprising a pole tip capable of writing on tracks of a data storage medium. The method also includes providing first and second writing-assistance wires between the pole tip and the trailing shield in a down-track direction to enable a writing-assistance current to be provided to produce an assist magnetic field that augments a write field produced by the write pole.

In yet another embodiment, a data storage device is provided. The data storage device includes a data storage medium having tracks. The data storage device also includes a recording head including a writer having a write pole and a trailing shield. The write pole includes a pole tip configured to write on the tracks of the data storage medium. The recording head further includes first and second writing-assistance wires positioned between the pole tip and the trailing shield in a down-track direction to enable a writing-assistance current to be provided to produce an assist magnetic field that augments a write field produced by the write pole.

Other features and benefits that characterize embodiments of the disclosure will be apparent upon reading the following detailed description and review of the associated drawings.

BRIEF DESCRIPTION OF THE DRAWINGS

FIGS. 2G through 2I are simplified bock diagrams showing altering current supplied to wires of different writers of the type shown in FIGS. 2A-2F.

DETAILED DESCRIPTION OF ILLUSTRATIVE EMBODIMENTS

Embodiments of the disclosure relate to magnetic recording heads that employ multiple (e.g., two) writing-assistance wires. However, prior to providing details regarding the different embodiments, a description of an illustrative operating environment is provided below.

Figure 1A:
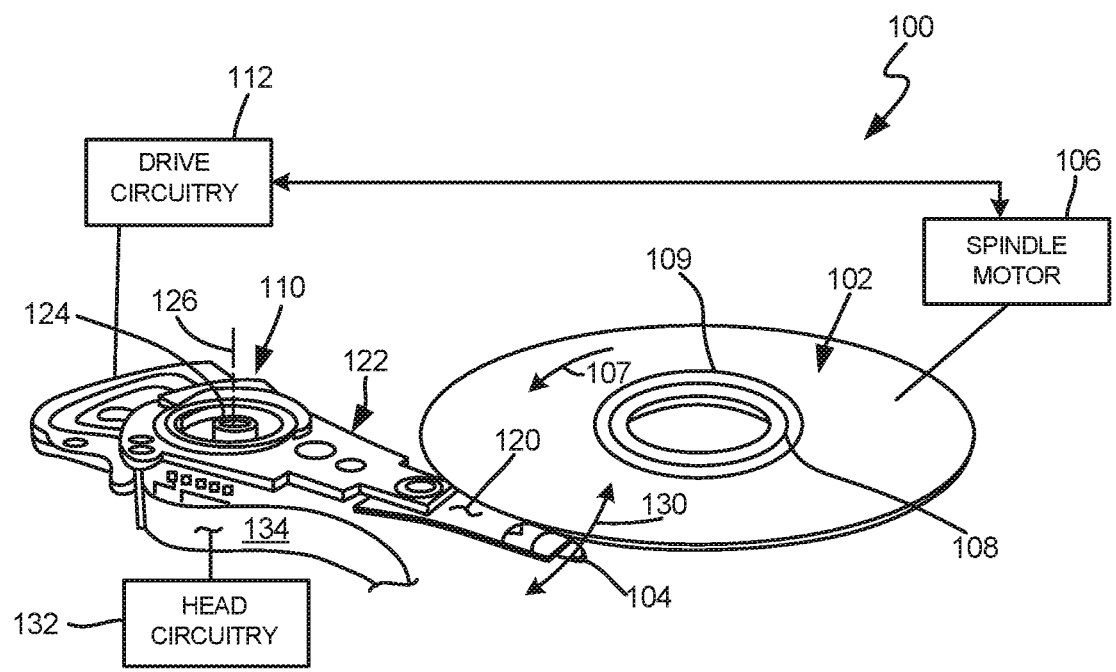
FIG. 1A illustrates an embodiment of a data storage device in which embodiments of the present application can be used.

FIG. 1A shows an illustrative operating environment in which certain recording head embodiments as disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1A is a schematic illustration of a data storage device 100 including a data storage medium and a recording head for reading data from and/or writing data to the data storage medium. As shown in FIG. 1A, the data storage device 100 includes a data storage medium or disc 102 and a recording head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks (e.g., 108 and 109) on the rotating medium 102. In some embodiments, tracks 108 and 109 may be written in a conventional non-overlapping format. In other embodiments, the tracks may be written in a partially-overlapping shingled pattern. An example of shingled magnetic recording is provided further below win connection with FIG. 3.

In the embodiment of FIG. 1A, both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
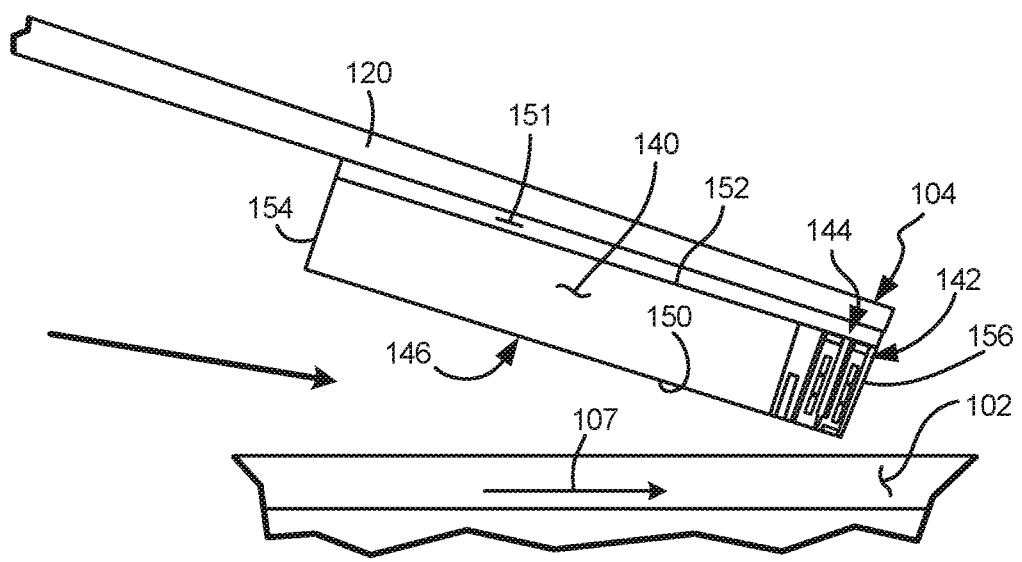
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly or writer 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A transducer/recording head portion including a writer in accordance with different embodiments is described below in connection with FIGS. 2A-2F.

Figure 2A:
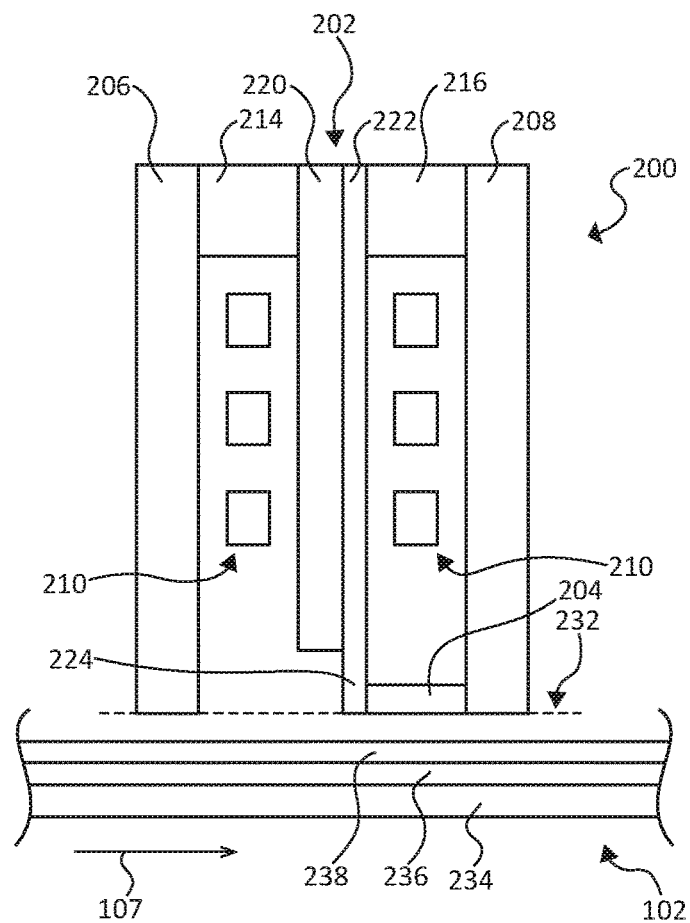
FIG. 2A is a schematic cross-sectional view of a writer including writing-assistance wires positioned in a down-track direction in accordance with a first embodiment.
Figure 2B:
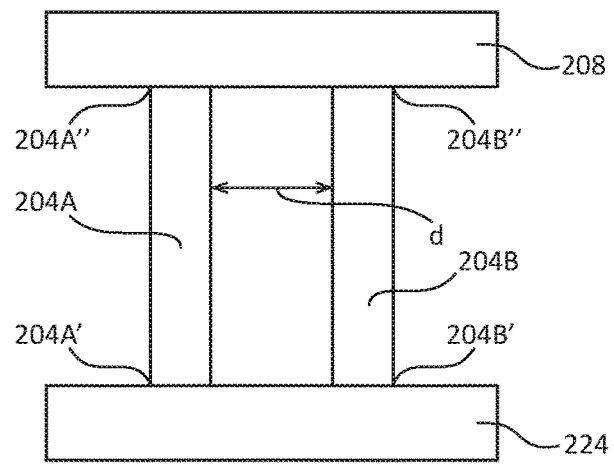
FIG. 2B is a bearing surface view of a portion of the writer of FIG. 2A.

FIG. 2A is a cross-sectional view of a writer 200 including two writing-assistance wires positioned in a down-track direction (e.g., a length of each of the two writing-assistance wires is directed in the down-track direction) in accordance with one embodiment. FIG. 2B is a bearing surface view of a portion of writer 200 that includes the two writing-assistance wires. Referring to FIGS. 2A and 2B, writer 200 includes a write pole 202, a first writing-assistance wire 204A, a second writing-assistance wire 204B, a first return pole or leading shield 206, a second return pole or trailing shield 208, and a conductive coil 210. Write pole 202 is magnetically coupled to first return pole 206 by a first magnetic piece 214, and to second return pole 208 by second magnetic piece 216. Conductive coil 210 surrounds write pole 202 such that portions of conductive coil 210 are disposed between write pole 202 and first return pole or leading shield 206, and between write pole 202 and second return pole or trailing shield 208. Write pole 202 includes yoke 220 and write pole body 222 having write pole tip 224.

First return pole or leading shield 206, second return pole or trailing shield 208, first magnetic piece 214, and second magnetic piece 216 may comprise soft magnetic materials, such as NiFe. Conductive coil 210 may comprise a material with low electrical resistance, such as Cu. Write pole body 222 may comprise a high moment soft magnetic material, such as CoFe, and yoke 220 may comprise a soft magnetic material, such as NiFe, to improve the efficiency of flux delivery to write pole body 222.

As indicated above, writer 200 confronts magnetic medium 102 at medium confronting surface or bearing surface 232 defined by write pole tip 224, first return pole or leading shield 206, writing-assistance wires 204A and 204B and second return pole or trailing shield 208. As noted above, a portion of bearing surface 232 is shown in FIG. 2B. Magnetic medium 102 includes substrate 234, soft underlayer (SUL) 236, and medium layer 238. SUL 236 is disposed between substrate 234 and medium layer 238. Magnetic medium 102 is positioned proximate to writer 200 such that the surface of medium layer 238 opposite SUL 236 faces write pole 202. Magnetic medium 102 is shown merely for purposes of illustration, and, as indicated above, may be any type of medium usable in conjunction with writer 200, such as composite media (e.g., exchange coupled composite (ECC) media), continuous/granular coupled (CGC) media, ECC+ECG media, discrete track media, and bit-patterned media.

Writer 200 is carried over the surface of magnetic medium 102, which is moved relative to writer 200 as indicated by arrow 107 such that write pole 202 trails first return pole or leading shield 206, leads second return pole 208, and is used to physically write data to magnetic medium 230. In order to write data to magnetic medium 230, a current is caused to flow through conductive coil 210. The magnetomotive force in conductive coil 210 causes magnetic flux to travel from write pole tip 224 perpendicularly through medium layer 238, across SUL 236, and through first return pole or leading shield 206 and first magnetic piece 214 to provide a first closed magnetic flux path. The direction of the write field at the medium confronting surface of write pole tip 224, which is related to the state of the data written to magnetic medium 102, is controllable based on the direction that the first current flows through first conductive coil 210.

Stray magnetic fields from outside sources, such as a voice coil motor associated with actuation of writer 200 relative to magnetic medium 102, may enter SUL 236. Due to the closed magnetic path between write pole 202 and first return pole or leading shield 206, these stray fields may be drawn into writer 200 by first return pole or leading shield 206. In order to reduce or eliminate these stray fields, second return pole or trailing shield 208 is connected to write pole 202 via second magnetic piece 216 to provide a flux path for the stray magnetic fields. The stray fields enter first return pole or leading shield 206, travels through first magnetic piece 214 and second magnetic piece 216, and exits magnetic writer 200 via second return pole or trailing shield 208.

Writer 200 is shown merely for purposes of illustrating an example construction that may be used in conjunction with the principles of the present disclosure, and variations on this design may be made. For example, while write pole 202 includes write pole body 222 and yoke 220, write pole 202 can also be comprised of a single layer of magnetic material. In addition, a single trailing return pole or trailing shield 208 may be provided instead of the shown dual return pole writer configuration. Furthermore, in some embodiments, the second return pole and the trailing shield may be different portions as shown in writer 207 of FIGS. 2C and 2D. Here, portion 208 is the second return pole and portion 209 is the separate trailing shield that extends from the return pole 208.

Figure 2C:
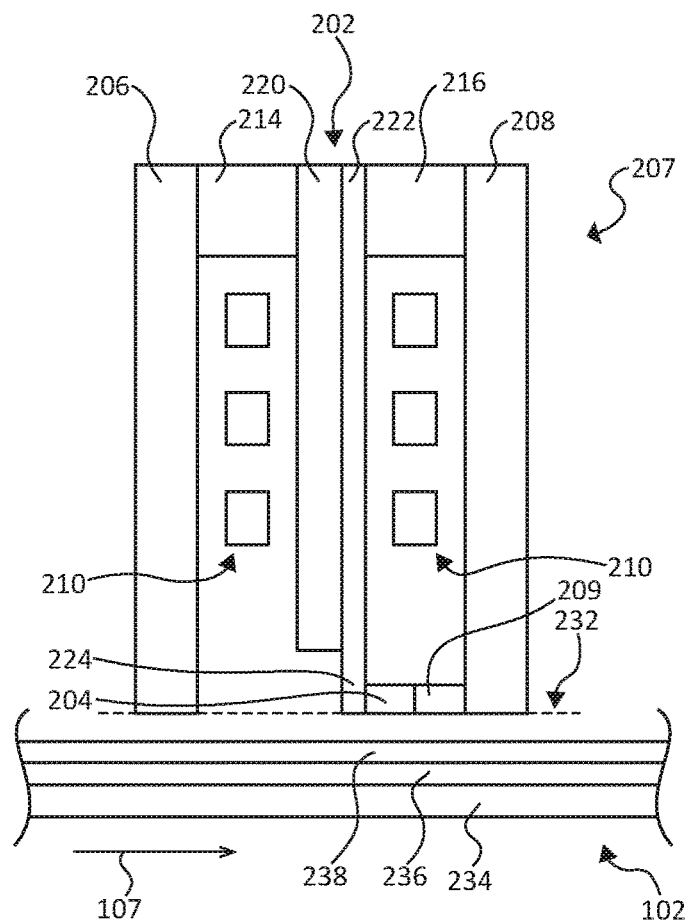
FIG. 2C is a schematic cross-sectional view of a writer including writing-assistance wires positioned in a down-track direction in accordance with a second embodiment.
Figure 2D:
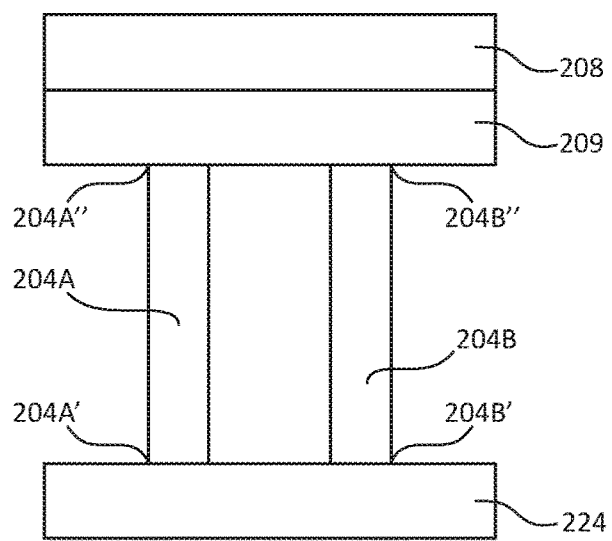
FIG. 2D is a bearing surface view of a portion of the writer of FIG. 2C.

Referring back to FIGS. 2A and 2B, to write data to high coercivity medium layer 238, a stronger write field may be provided to impress magnetization reversal in the medium. To accomplish this, writing-assistance wires 204A and 204B are provided proximate to magnetic medium 102 in a down-track direction. In the embodiment of FIGS. 2A and 2B, writing-assistance wires 204A and 204B are separated from each other by a distance "d." Also, first end 204A' of wire 204A is in contact with pole tip 224 and second end 204A" of wire 204A is in contact with second return pole or trailing shield 208. Similarly, first end 204B' of wire 204B is in contact with pole tip 224 and second end 204B" of wire 204B is in contact with second return pole or trailing shield 208. In some embodiments, when a writing-assistance current is applied to first writing-assistance wire 204A and to second writing-assistance wire 204B, an assist magnetic field is generated that augments or amplifies the write field produced by write pole 202. The combination of the write field and the assist field generated by wires 204A and 204B overcomes the high coercivity of medium layer 238 to permit controlled writing of data to magnetic medium 102. In the embodiment of FIGS. 2C and 2D, which is similar to the embodiment of FIGS. 2A and 2B, writing-assistance wires 204A and 204B are also in contact with both pole tip 224 and trailing shield portion 209.

Figure 2E:
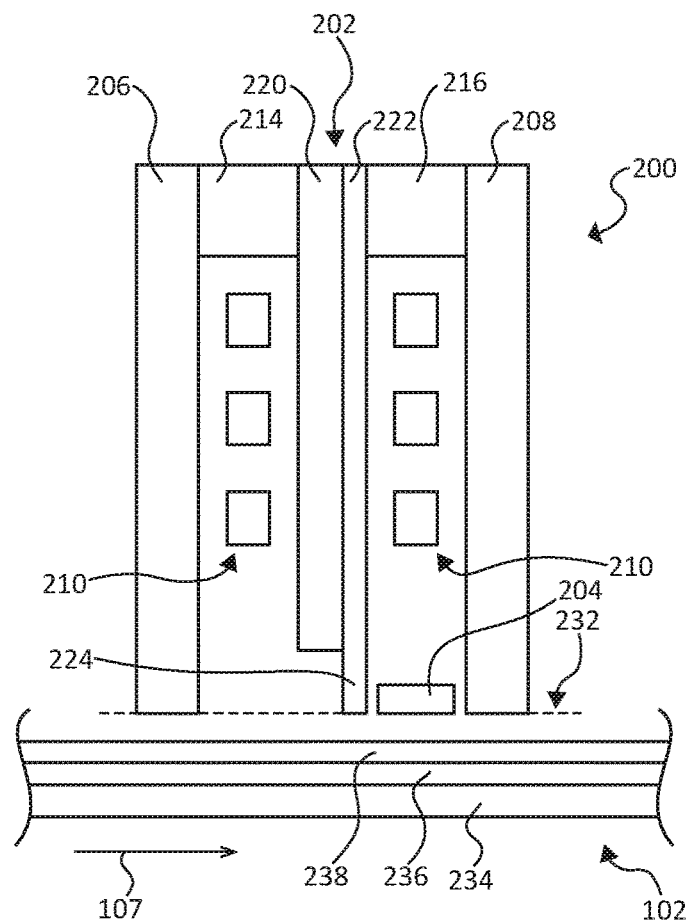
FIG. 2E is a schematic cross-sectional view of a writer including writing-assistance wires positioned in a down-track direction in accordance with a third embodiment.
Figure 2F:
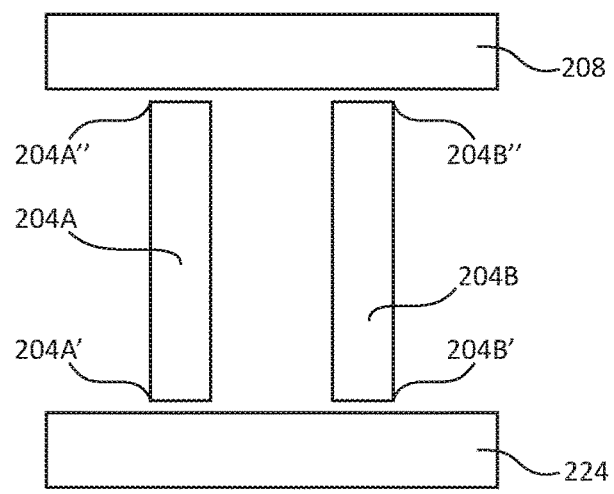
FIG. 2F is a bearing surface view of a portion of the writer of FIG. 2E.

FIGS. 2E and 2F illustrate a writer 250 embodiment in which first end 204A' of first writing-assistance wire 204A is proximate to, but not in contact with, pole tip 224 and second end 204A" of wire 204A is proximate to, but not in contact with, second return pole or trailing shield 208. Similarly, first end 204B' of second writing-assistance wire 204B is proximate to, but not in contact with, pole tip 224 and second end 204B" of wire 204B proximate to, but not in contact with, second return pole or trailing shield 208. In other respects, writer 250 is substantially similar to writers 200 (of FIGS. 2A and 2B) and writer 207 (of FIGS. 2C and 2D). It should be noted that insulators, which may be included to provide electrical isolation between the main pole 224 and the wires 204A and 204B and between the trailing shield 208 and the wires 204A and 204B, are not shown in FIG. 2F in the interest of simplification.

FIGS. 2G through 2I are simplified bock diagrams showing writing-assistance altering current supplied to wires of different writers of the type shown in FIGS. 2A-2F. In the embodiments shown in FIGS. 2G-2I, the writing-assistance current in provided in a first direction through first writing-assistance wire 204A and provided in a second direction through second writing-assistance wire 204B. The second current direction is opposite to the first current direction.

In the embodiment of FIG. 2G, first end 204A' of first writing-assistance wire 204A of is electrically coupled to first end 204B' of second writing-assistance wire 204B. An alternating current power supply 226 that has first and second supply terminals 228 and 230, respectively, provides the writing-assistance current to wires 204A and 204B. The first supply terminal 228 is electrically coupled to second end 204A" of first writing-assistance wire 204A, and the second supply terminal 230 is coupled to the second end of the second writing-assistance wire. A shunting resistor 232 may be connected in parallel with alternating current power supply 226 (as shown in FIG. 2G) for current control. Alternatively, shunting resistor 232 may be connected in series with alternating current power supply 226 for voltage control. In general, shunting resistor 232 may be used when a current source already built into the head is too large. It should be noted that insulators, which may be included to provide electrical isolation between the main pole 224 and the wires 204A and 204B and between the trailing shield 208 and the wires 204A and 204B, are not shown in FIG. 2G in the interest of simplification. The circuit configuration shown in FIG. 2G, in which writing-assistance wires 204A and 204B are connected in series, may be useful for supplying the writing-assistance current in writer 250 of FIGS. 2E and 2F. FIG. 2I, which is described further below, is a parallel version of FIG. 2G.

FIG. 2H illustrates another configuration for supplying the writing-assistance current to wires 204A and 204B. In the embodiment of FIG. 2H, return pole or trailing shield 208, 209 is divided into a first trailing shield portion 208A and a second trailing shield portion 208B. The first trailing shield portion 208A is separated from the second trailing shield portion 208B by an insulation layer 234. As can be seen in FIG. 2H, first end 204A' of first writing-assistance wire 204A is in contact with pole tip 224. Also, first end 204B' of second writing-assistance wire 204B is in contact with pole tip 224. Further, second end 204A" of first writing-assistance wire 204A is in contact with first trailing shield portion 208A, and second end 204B" of second writing-assistance wire 204B of is in contact with second trailing shield portion 208B. The writing-assistance current is provided by electrically connecting first supply terminal 228 of alternating current power supply 226 to first trailing shield portion 208A and connecting second supply terminal 230 of alternating current power supply 226 to second trailing shield portion 208B. The circuit configuration shown in FIG. 2H may be useful for supplying the writing-assistance current in writer 200 of FIGS. 2A and 2B and in writer 207 of FIGS. 2C and 2D.

FIG. 2I illustrates yet another configuration for supplying the writing-assistance current to wires 204A and 204B. In the embodiment of FIG. 2I, wires 204A and 204B are electrically isolated from pole tip 224 by insulation layer 236A, and insulation layer 236B electrically isolates wires 204A and 204B from trailing shield 208. Thin electrical contacts 238A may be provided at first ends 204A' and 204B' of first and second wires 204A and 204B, respectively. Also, electrical contacts 238B may be provided at second ends 204A" and 204B" of first and second wires 204A and 204B, respectively. As can be seen in FIG. 2I, the writing-assistance current is provided to the first writing-assistance wire 204A and to the second writing-assistance wire 204B by a parallel connection. In the example of FIG. 2I, to form the parallel electrical connection, first supply terminal 228 of alternating current power supply 226 is electrically coupled to second end 204A″ of first writing-assistance wire 204A and is also electrically coupled to first end 204B′ of second writing-assistance wire 204B. Further, second supply terminal 230 of alternating current power supply 226 is electrically coupled to first end 204A′ of first writing-assistance wire 204A and is also electrically coupled to second end 204B″ of second writing-assistance wire 204B. In general, a same terminal 228, 230 of the alternating current power supply 226 is electrically coupled to opposite ends of the two different wires 204A and 204B via electrical contacts 238A, 238B to provide a parallel connection utilized to supply currents in opposite directions in the wires 204A and 204B. The circuit configuration shown in FIG. 2I may be useful for supplying the writing-assistance current in writer 250 of FIGS. 2E and 2F.

Figure 3:
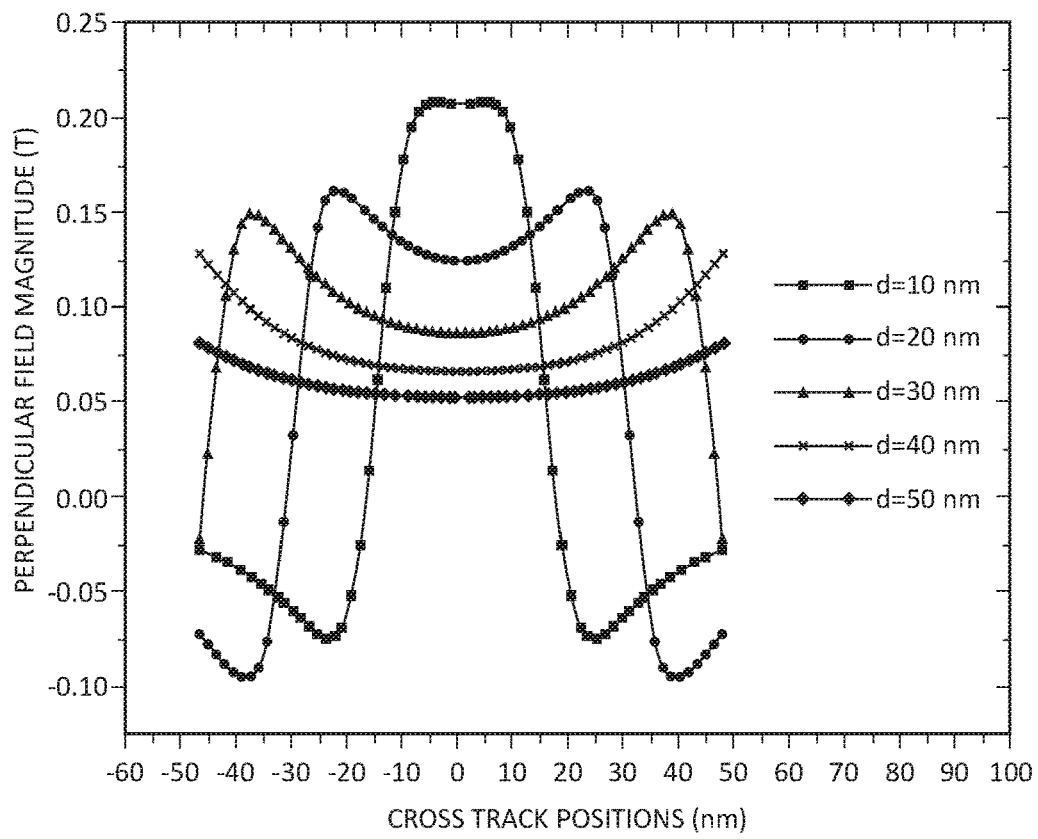
FIGS. 3-5 are graphs of data obtained for different writer embodiments.
Figure 4:
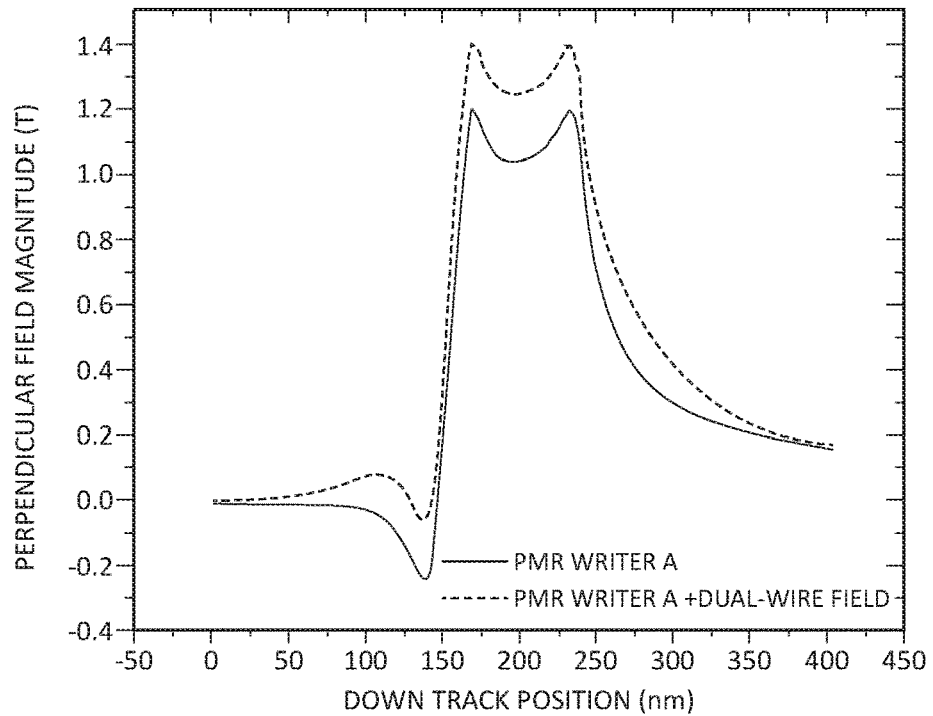
Figure 5:
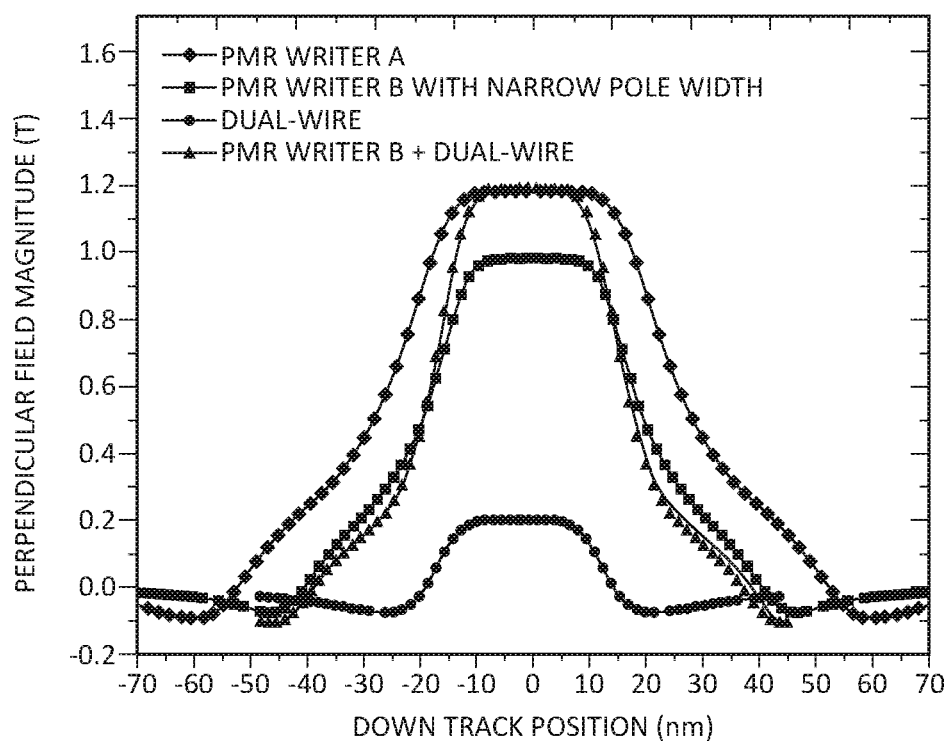

In general, any suitable circuit configuration may be utilized to provide current to wires 204A and 204B of different writers of the type shown in FIGS. 2A-2F as long as a direction of current flowing through one wire (e.g., 204A) is in a direction opposite to the direction of current flow in the other wire (e.g., 204B). In some embodiments, the wire 204A, 204B length in the down-track direction can be 20 nanometers (nm) to 60 nm based on the available front shield gap (gap between main pole and trailing shield). The wire diameter also varies and may be limited by the cross-track width of the main pole and the spacing "d." A wire diameter used for field distribution results described below in connection with FIGS. 3-5 is 30 nm. It should be understood that the example wire dimensions (e.g., length and diameter) provided above are non-limiting examples, and any suitable wire dimensions may be used in different embodiments.

A writer with dual wires described above is an alternative to a writer that employs a single wire to provide the writing-assistance magnetic field. Based on Ampere's law, in a dual wire configuration of the type shown in FIGS. 2A-2I, half of the current density is employed to achieve a magnetic field of a same magnitude as that generated by a single wire configuration. FIG. 3 shows cross-track distributions of perpendicular magnetic field components of the total magnetic field generated by the two wires. As noted above, a gap between the dual wires is defined as "d." The perpendicular wire fields become symmetric around a track center, which is defined as a "0" cross-track position. With a relatively small wire-to-wire spacing of about 10 nm, an even higher perpendicular field compared to a single wire, about 0.2 tesla (T) compared to 0.15 T, can be achieved with just about half the current density used for the single wire. This finding is important and may be implemented to improve areal densities of hard disk drives for any type of recording technology, such as perpendicular magnetic recording (PMR), heat-assisted magnetic recording (HAMR), or microwave-assisted magnetic recording (MAMR). In general, performance is limited by the maximum magnetic field generated by the main pole. By activating the dual wires, even if the main pole is saturated, the magnetic field can be enhanced. For example, as shown in FIG. 4, a peak field generated by a saturated main pole of PMR writer A is about 1.2 T. The peak field can reach around 1.4 T (a 17% improvement) by utilizing an integrated head with dual wires.

More importantly, as shown in FIG. 3, the narrow cross-track distributions of the dual-wire perpendicular fields have the potential to enable higher track density capacity. In today's PMR systems, track pitch capability may be increased by reducing the writer dimension in the cross-track direction. However, a performance penalty may be observed when reducing the pole width. To demonstrate this, FIG. 5 shows cross-track distributions of maximum perpendicular fields provided by different head designs at saturation. PMR writer A can generate a maximum field of around 1.2 T. The perpendicular field provided by PMR writer B, which has an approximately 20% narrower pole width than writer A, can only reach around 1.0 T. Narrower tracks can be written by using writer B, but the recording performance is worse due to the decreased perpendicular field. With the additional about 0.2 T perpendicular wire field generated by the dual wires, the integrated writer can provide a maximum perpendicular field of 1.2 T with a narrower field distribution. Assuming a constant media coercivity, a substantially accurate estimation of the written track width can be made. Thus, based on FIG. 5, a 40% track density improvement can be expected under certain (e.g., optimal) conditions. Additionally, as shown in FIGS. 4 and 5, both the cross-track field gradient and down-track field gradient can also be improved compared to PMR writer A. Similarly, track density can be increased by reducing the write power of the main pole without physically changing the pole width.

In summary, a dual-wire assisted perpendicular magnetic recording system described above has at least the following benefits:

1. Dual wires generate a symmetric field distribution in the cross-track dimension compared to a single wire design, which provides an asymmetric field.

2. The current density is reduced by 50%, relative to a single wire design, for a targeted field magnitude.

3. The dual-wire field further enhances the peak field by 17% even after the main pole gets saturated.

4. The dual-wire configuration can maintain the peak field magnitude when narrower tracks are written. Thus, the track density may be improved by about 40%.

Figure 6:
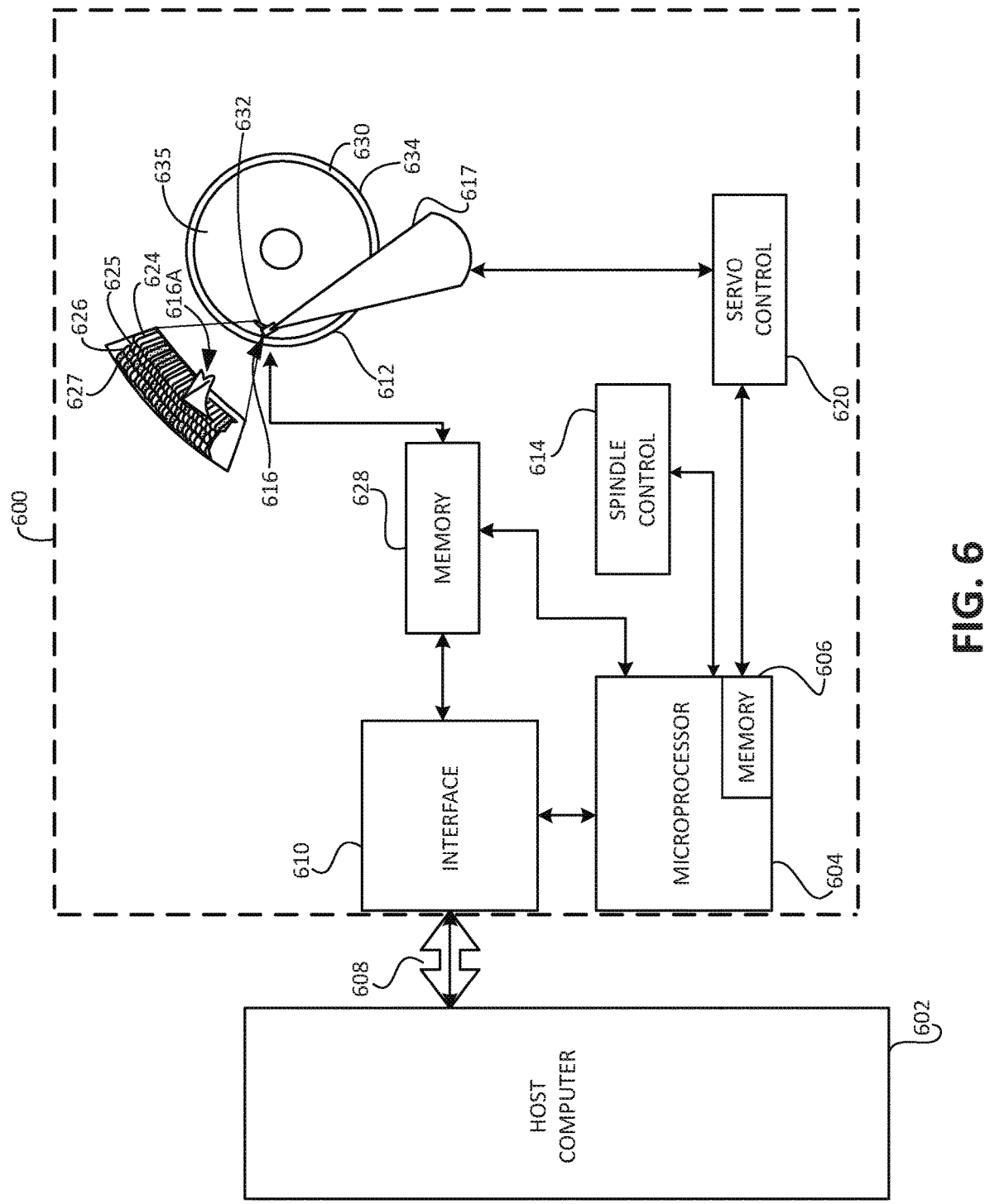
FIG. 6 is a block diagram of a data storage device in which tracks are written in a shingled format in accordance with one embodiment.

FIG. 6 shows a block diagram of a disc drive 600 that includes a writer such as 200 (of FIGS. 2A and 2B), 207 (of FIGS. 2C and 2D), or 250 (of FIGS. 2E and 2F). An alternating current supplied to the writing-assistance wires in accordance with one embodiment. As will be described in detail further below, in one embodiment disc drive 600 employs one or more discs on which multiple data tracks may be written in a partially-overlapping shingled pattern, with each successive track overwriting a portion of the previous track. The writing of relatively narrow tracks when the alternating current is supplied to the writing-assistance wire is well-suited for writing tracks in partially-overlapping shingled pattern to provide a TPI advantage.

Disc drive 600 is shown in FIG. 6 to be operably connected to a host computer 602 in which disc drive 600 may be mounted. Disc drive 600 includes a microprocessor 604 that generally provides top level communication and control for disc drive 600 in conjunction with programming for microprocessor 604 stored in microprocessor memory 606. Disc drive 600 may communicate with host computer 602 using a bus 608.

Memory 606 can include random access memory (RAM), read only memory (ROM), and other sources of resident memory for microprocessor 604. Disc drive 600 includes one or more data storage discs 612. Discs 612 are rotated at a substantially constant high speed by a spindle control circuit 614. One or more recording heads 616 including writers such as 200, 207 or 250 (not separately shown in FIG. 6) communicate with the surface(s) of discs 612 to carry out data read/write operations. The radial position of heads 616 is controlled through the application of current to a coil in an actuator assembly 617. A servo control system 620 provides such control.

As noted above, in some embodiments, tracks may be written on one or more storage discs 612 in a partially-overlaying relationship. The overlaying of tracks is shown in close-up view of area of disc(s) 632. In area 632, a corner of head 616A (including, for example, a writer 200 (of FIGS. 2A and 2B), 207 (of FIGS. 2C and 2D), or 250 (of FIGS. 2E and 2F)) is shown writing a track portion 624. Different shading within the track portion 624 represents different magnetic orientations that correspond to different values of stored binary data. The track portion 624 is overlaid over part of track portion 625. Similarly, track portion 625 is overlaid over part of portion 626, portion 626 is overlaid over portion 627, etc.

The portions 624-627 may be part of what is referred to herein as a physical band which, in this embodiment, may include tens, hundreds or thousands of similarly overlapping, concentric portions 624-627. Gaps are created between such physical bands so that each physical band can be updated independently of other physical bands. The overlaying of successive track portions within a physical band in shingled magnetic recording means that individual parts of the physical band may not be randomly updated on their own. This is because spacings between centers of track portions 624, 625, 626, 627, for example, are smaller than a width of a write pole (not separately show) of head 616. However, a width of a reader (not separately shown) of head 616 may be small enough to read individual track portions 624, 625, 626, 627, thereby enabling random reads of data to be carried out.

In certain embodiments, disc drive 600 includes a memory 628 that may serve as, for example, a first/upper level cache. In some embodiments, memory 628 is physically separate from discs 612. The memory 628 may be of a different type than the discs 612.

In some embodiments, the one or more storage discs 612 are managed as non-overlapping disc portion 630 and disc portion 635. In some embodiments, disc portion 630 is used for a second level cache (e.g., a portion of the disc(s) 612 may be reserved for use as second level cache). In some embodiments, disc portion 630 may comprise shingled bands. In other embodiments, disc portion 630 may be non-shingled (e.g., element 630 may include tracks that are each of a sufficiently large width relative to the width of the write pole of head 616 to allow the write pole to write data to individual ones of the tracks without overwriting data in any adjacent tracks).

Disc drive 600 may use memory 628 in conjunction with disc portion 630 in order to manage data as the data is being transferred to main storage locations 635 on disc(s) 612. As noted above, the data storage operations are carried out with the help of a writer such as 200 (of FIGS. 2A and 2B), 207 (of FIGS. 2C and 2D), or 250 (of FIGS. 2E and 2F) with an alternating current supplied to the writing-assistance wire. In the interest of simplification, components such as a read/write channel which encodes data and provides requisite write current signals to heads 616 is not shown in FIG. 6.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A recording head for writing data on tracks of a data storage medium, the recording head comprising:
   a writer having a write pole and a trailing shield, the write pole comprising a pole tip configured to write on the tracks of the data storage medium;
   first and second writing-assistance wires positioned between the pole tip and the trailing shield in a down-track direction parallel to a bearing surface of the recording head; and
   electrical circuitry configured to drive a writing-assistance current parallel to the bearing surface in a first direction through the first writing-assistance wire and in a second direction through the second writing-assistance wire, the second direction being opposite to the first direction.

2. The recording head of claim 1 and wherein the electrical circuitry comprises an alternating current power supply.

3. The recording head of claim 1 and wherein the trailing shield comprises a first trailing shield portion and a second trailing shield portion, and wherein the first trailing shield portion is separated from the second trailing shield portion by an insulation layer.

4. The recording head of claim 3 and wherein the first writing-assistance wire comprises a first end that is in contact with the pole tip and a second end that is in contact with the first trailing shield portion, and wherein the second writing-assistance wire comprises a first end that is in contact with the pole tip and a second end that is in contact with the second trailing shield portion.

5. The recording head of claim 4 and wherein the electrical circuitry comprises an alternating current power supply that comprises a first supply terminal that is coupled to the first trailing shield portion and a second supply terminal that is coupled to the second trailing shield portion.

6. The recording head of claim 1 and wherein the first writing-assistance wire comprises a first end that is proximate to, but not in contact with, the pole tip and a second end that is proximate to, but not in contact with, the trailing shield, and wherein the second writing-assistance wire comprises a first end that is proximate to, but not in contact with, the pole tip and a second end that is proximate to, but not in contact with, the trailing shield.

7. The recording head of claim 6 and wherein the electrical circuitry comprises:
an electrical connector that electrically couples the first end of the first writing-assistance wire to the first end of the second writing-assistance wire; and
an alternating current power source that comprises a first supply terminal that is coupled to the second end of the first writing-assistance wire and a second supply terminal that is coupled to the second end of the second writing-assistance wire.

8. The recording head of claim 6 and the electrical circuitry comprises an alternating current power supply that comprises a first supply terminal, which is electrically coupled to the first end of the first writing-assistance wire and electrically coupled to the second end of the second writing-assistance wire, and a second supply terminal that is coupled to the second end of the first writing-assistance wire and coupled to the first end of the second writing-assistance wire.

9. A method comprising:
providing a writer having a write pole and a trailing shield, the write pole comprising a pole tip capable of writing on tracks of a data storage medium; and
providing first and second writing-assistance wires between the pole tip and the trailing shield in a down-track direction parallel to a bearing surface of a recording head that includes the writer and the first and second writing-assistance wires to enable a writing-assistance current to be provided to produce an assist magnetic field that augments a write field produced by the write pole; and
providing electrical circuitry configured to drive a writing-assistance current parallel to the bearing surface in a first direction through the first writing-assistance wire and in a second direction through the second writing-assistance wire, the second direction being opposite to the first direction.

10. The method claim 9 and further comprising providing the electrical circuitry comprises providing an alternating current power supply.

11. The method of claim 10 and further comprising connecting the first writing-assistance wire and the second writing-assistance wire in series with the alternating current power supply.

12. The method of claim 10 and further comprising connecting the first writing-assistance wire and the second writing-assistance wire in parallel with the alternating current power supply.

13. A data storage device comprising:
a data storage medium having tracks;
a recording head comprising:
a writer having a write pole and a trailing shield, the write pole comprising a pole tip configured to write on the tracks of the data storage medium;
first and second writing-assistance wires positioned between the pole tip and the trailing shield in a down-track direction parallel to a bearing surface of the recording head; and
electrical circuitry configured to drive a writing-assistance current parallel to the bearing surface in a first direction through the first writing-assistance wire and in a second direction through the second writing-assistance wire, the second direction being opposite to the first direction.

14. The recording head of claim 13 and wherein the electrical circuitry comprises an alternating current power supply.

15. The recording head of claim 13 and wherein the trailing shield comprises a first trailing shield portion and a second trailing shield portion, and wherein the first trailing shield portion is separated from the second trailing shield portion by an insulation layer.

16. The recording head of claim 15 and wherein the first writing-assistance wire comprises a first end that is in contact with the pole tip and a second end that is in contact with the first trailing shield portion, and wherein the second writing-assistance wire comprises a first end that is in contact with the pole tip and a second end that is in contact with the second trailing shield portion.

17. The recording head of claim 16 and wherein the electrical circuitry comprises an alternating current power supply that comprises a first supply terminal that is coupled to the first trailing shield portion and a second supply terminal that is coupled to the second trailing shield portion.

18. The recording head of claim 13 and wherein the first writing-assistance wire comprises a first end that is proximate to, but not in contact with, the pole tip and a second end that is proximate to, but not in contact with, the trailing shield, and wherein the second writing-assistance wire comprises a first end that is proximate to, but not in contact with, the pole tip and a second end that is proximate to, but not in contact with, the trailing shield.

19. The recording head of claim 18 and wherein the electrical circuitry comprises:
an electrical connector that electrically couples the first end of the first writing-assistance wire to the first end of the second writing-assistance wire; and
an alternating current power source that comprises a first supply terminal that is coupled to the second end of the first writing-assistance wire and a second supply terminal that is coupled to the second end of the second writing-assistance wire.

20. The recording head of claim 18 and the electrical circuitry comprises an alternating current power supply that comprises a first supply terminal, which is electrically coupled to the first end of the first writing-assistance wire and electrically coupled to the second end of the second writing-assistance wire, and a second supply terminal that is coupled to the second end of the first writing-assistance wire and coupled to the first end of the second writing-assistance wire.

\* \* \* \* \*